(12) United States Patent
Jeong et al.

(10) Patent No.: US 9,360,055 B2
(45) Date of Patent: Jun. 7, 2016

(54) DOUBLE CLUTCH SYSTEM FOR HYBRID ELECTRIC VEHICLE

(71) Applicant: Hyundai Motor Company, Seoul (KR)

(72) Inventors: Eui Hee Jeong, Hwaseong-si (KR); Jinwoo Lee, Cheolwon-gun (KR); Jeong Heon Kam, Seongnam-si (KR); Jong Min Kim, Busan (KR)

(73) Assignee: Hyundai Motor Company, Seoul (KR)

( * ) Notice: Subject to any disclaimer, the term of this patent is extended or adjusted under 35 U.S.C. 154(b) by 215 days.

(21) Appl. No.: 14/141,367

(22) Filed: Dec. 26, 2013

(65) Prior Publication Data

US 2015/0024903 A1    Jan. 22, 2015

(30) Foreign Application Priority Data

Jul. 17, 2013   (KR) ......................... 10-2013-0084387

(51) Int. Cl.
| | |
|---|---|
| *F16D 21/02* | (2006.01) |
| *B60K 6/387* | (2007.10) |
| *F16D 21/06* | (2006.01) |
| *B60K 6/48* | (2007.10) |
| *F16D 21/08* | (2006.01) |
| *B60K 6/547* | (2007.10) |

(52) U.S. Cl.
CPC ............... *F16D 21/02* (2013.01); *B60K 6/387* (2013.01); *B60K 6/48* (2013.01); *B60K 6/547* (2013.01); *F16D 21/06* (2013.01); *F16D 21/08* (2013.01); *B60K 2006/4825* (2013.01); *F16D 2021/0615* (2013.01); *Y02T 10/6221* (2013.01); *Y02T 10/6252* (2013.01); *Y02T 10/76* (2013.01); *Y10S 903/902* (2013.01); *Y10T 477/26* (2015.01)

(58) Field of Classification Search
CPC ....................................................... F16D 21/02
See application file for complete search history.

(56) References Cited

U.S. PATENT DOCUMENTS

2003/0066728 A1* 4/2003 Hirt .......................... F16D 21/06
192/48.8

FOREIGN PATENT DOCUMENTS

| DE | 102007051991 | * 10/2007 |
|---|---|---|
| DE | 102011089463 | * 12/2011 |

* cited by examiner

*Primary Examiner* — Mark Manley
(74) *Attorney, Agent, or Firm* — Morgan, Lewis & Bockius LLP

(57) ABSTRACT

A double clutch system may include a connecting shaft that is continuously connected to a motor/generator and is selectively connected to an engine and may transmit torque transmitted to the connecting shaft selectively to two input shafts.

18 Claims, 3 Drawing Sheets

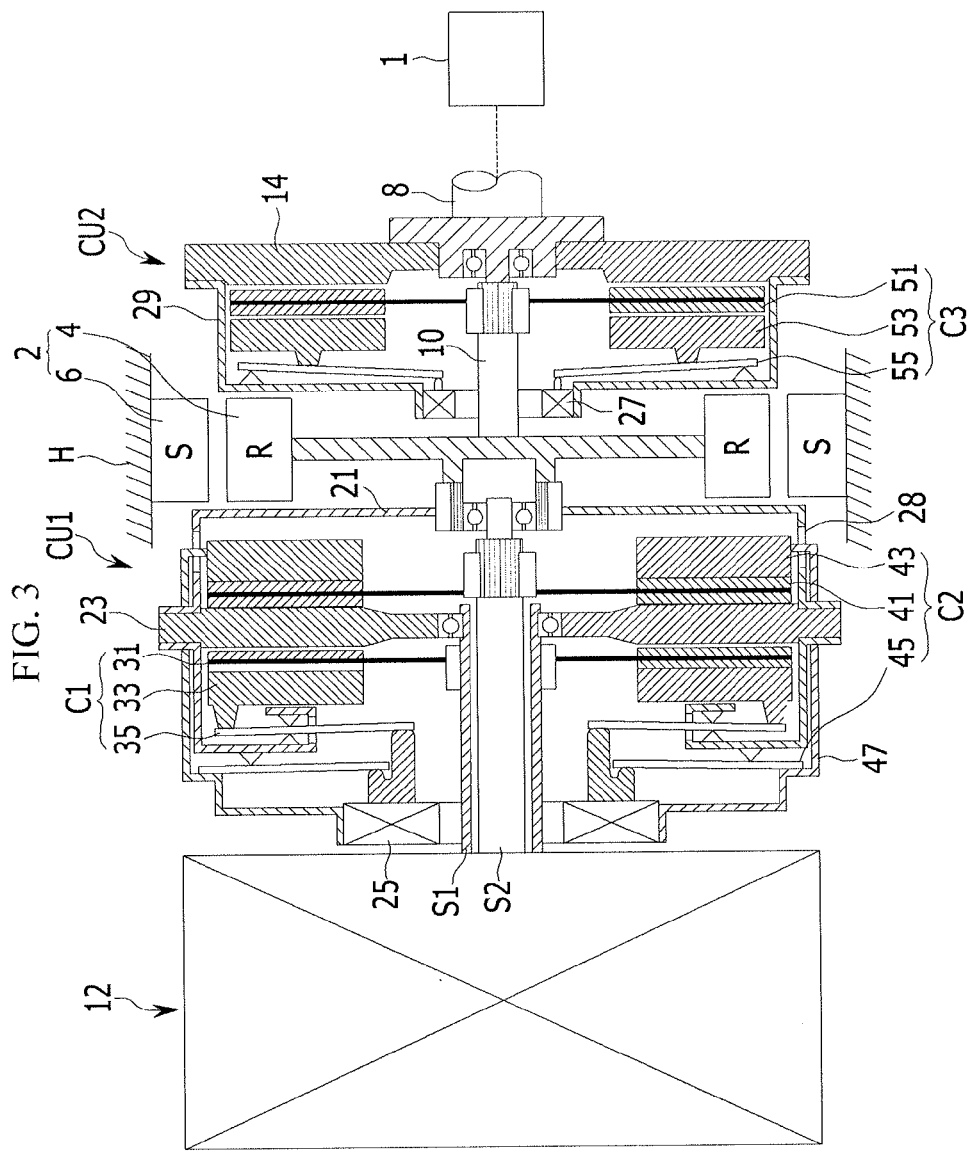

DOUBLE CLUTCH SYSTEM FOR HYBRID ELECTRIC VEHICLE

CROSS-REFERENCE TO RELATED APPLICATION

The present application claims priority to Korean Patent Application No. 10-2013-0084387 filed on Jul. 17, 2013, the entire contents of which is incorporated herein for all purposes by this reference.

BACKGROUND OF THE INVENTION

1. Field of the Invention

The present invention relates to a double clutch system for a hybrid electric vehicle. More particularly, the present invention relates to a double clutch system for a hybrid electric vehicle that can prevent starting impact by applying a double clutch system of normal close type and can improve durability by minimizing abrasion of a clutch disk.

2. Description of Related Art

Environmentally-friendly technique of vehicles is very important technique on which survival of future motor industry is dependent. Vehicle makers are focusing on development of environmentally-friendly vehicles so as to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

In addition, the vehicle makers promote improvement of efficiency in a power delivery system so as to meet exhaust regulation of countries and improve fuel consumption performance. In order to improve efficiency of the power delivery system, the vehicle makers are trying to put an idle stop and go (ISG) system and a regenerative braking system to practical use.

Meanwhile, the hybrid electric vehicle is a vehicle using more than two power sources, and more than two power sources are combined in various ways. Typically, the hybrid electric vehicle uses a gasoline engine or a diesel engine driven by fossil fuel and a motor/generator driven by electrical energy.

In addition, one example of a transmission applied to the hybrid electric vehicle is the DCT. According to the DCT, two clutches are applied to a manual transmission layout. Therefore, efficiency and convenience may be improved.

That is, the DCT achieves odd-numbered-speeds and even-numbered-speeds alternately by using two clutches. A mechanism achieving the odd-numbered-speeds and the even-numbered-speeds alternately improves shift feel so as to solve problems of a conventional manual transmission (MT) and an automated manual transmission (AMT).

However, since both two clutches are clutches of normal open type in a conventional double clutch transmission of a vehicle, at least one clutch should be operated at starting. Therefore, starting impact may occur. In addition, shifting time should be short due to thermal capacity of the clutches at shifting. Therefore, shift shock is great compared with an automatic transmission.

In order to minimize the starting impact, the clutches are led to slip. However, abrasion of clutch disks and energy loss may be great and the vehicle may slide downward due to clutch slip at starting on an uphill road.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a double clutch system for a hybrid electric vehicle having advantages of preventing starting impact when the vehicle is started by a motor/generator, minimizing abrasion of clutch disks and improving durability by using a clutch of normal close type for one clutch between two clutches used in a double clutch transmission.

In addition, various aspects of the present invention are directed to providing a double clutch system for a hybrid electric vehicle having further advantages of enhancing fuel economy by using additional engine clutch of normal open type other than the two clutches and selectively cutting off torque of an engine.

In an aspect of the present invention, a double clutch system for a hybrid electric vehicle including a connecting shaft that is continuously connected to a motor/generator and is selectively connected to an engine and transmitting torque transmitted to the connecting shaft selectively to two input shafts, may include a double clutch unit including a double clutch actuator, and first and second clutches selectively connecting the connecting shaft to the two input shafts by control of the double clutch actuator, wherein the first clutch connects the connecting shaft to a first input shaft of the two input shafts and the second clutch does not connect the connecting shaft to a second input shaft of the two input shafts when the double clutch actuator does not operate, and wherein the first clutch does not connect the connecting shaft to the first input shaft and the second clutch connects the connecting shaft to the second input shaft when the double clutch actuator operates, and an engine clutch unit selectively connecting the engine to the connecting shaft.

The double clutch unit may further include a double clutch housing connected to the connecting shaft and being movable in an axial direction, and a rotating plate fixed at an inside of the double clutch housing and receiving torque of the connecting shaft, wherein the first clutch is disposed on the first input shaft and transmits torque of the rotating plate to the first input shaft only when the double clutch actuator does not operate, and wherein the second clutch is disposed on the second input shaft and transmits the torque of the rotating plate to the second input shaft only when the double clutch actuator operates.

The first clutch may include a first disk splined to the first input shaft in the double clutch housing, a first pressure plate selectively contacting the first disk to the rotating plate, and a first spring plate pushing the first pressure plate toward the first disk when the double clutch actuator does not operate, and removing force exerted on the first disk by the first pressure plate when the double clutch actuator operates.

The second clutch may include a second disk splined to the second input shaft in the double clutch housing, a second pressure plate supported by a connecting cover and disposed apart from the second disk when the double clutch actuator does not operate, and a second spring plate frictionally contacting the rotating plate, the second disk and the second pressure plate by pushing the rotating plate toward the second disk through the double clutch housing when the double clutch actuator operates.

The double clutch actuator is mounted at a side surface of the connecting cover.

The other side surface of the connecting cover is connected to the second pressure plate through a penetration hole formed at an exterior circumference of the double clutch housing.

The connecting cover and the double clutch housing are movable relatively in the axial direction.

The first input shaft is a hollow shaft and is involved in odd-numbered shift-speeds, and the second input shaft penetrates the first input shaft and is involved in even-numbered shift-speeds.

The engine clutch unit may include a flywheel connected to a crankshaft, a third clutch disposed on the connecting shaft and selectively transmitting the torque of the engine to the connecting shaft through the flywheel, and an engine clutch actuator controlling operation of the third clutch.

The third clutch may include a third disk splined to the connecting shaft, a third pressure plate selectively contacting the third disk to the flywheel, and a third spring plate pushing the third pressure plate toward the third disk when the engine clutch actuator operates, and removing force of the third pressure plate exerted on the third disk when the engine clutch actuator does not operate.

The engine clutch unit may further include a clutch cover coupled to the flywheel and accommodating the third clutch therein.

The engine clutch actuator is mounted at a side surface of the clutch cover, and the other side surface of the clutch cover is coupled to the flywheel.

The motor/generator may include a rotor connected to the connecting shaft, and a stator disposed at a radially outside of the rotor and fixed to a transmission housing.

In another aspect of the present invention, a double clutch system for a hybrid electric vehicle may include a motor/generator, a connecting shaft continuously connected to the motor/generator and receiving torque of the motor/generator, first and second input shafts alternately connected to the connecting shaft, a double clutch unit including a double clutch actuator, and first and second clutches alternately connecting the first and second input shafts to the connecting shaft by control of the double clutch actuator, wherein the first clutch connects the first input shaft to the connecting shaft when the double clutch actuator does not operate, and the second clutch connects the second input shaft to the connecting shaft when the double clutch actuator operates, and an engine clutch unit selectively connecting an engine to the connecting shaft.

The double clutch unit may further include a double clutch housing connected to the connecting shaft and being movable in an axial direction, and a rotating plate fixed at an inside of the double clutch housing and receiving torque of the connecting shaft, wherein the first clutch is disposed on the first input shaft and transmits torque of the rotating plate to the first input shaft only when the double clutch actuator does not operate, and wherein the second clutch is disposed on the second input shaft and transmits the torque of the rotating plate to the second input shaft when the double clutch actuator operates.

The first clutch may include a first disk splined to the first input shaft in the double clutch housing, a first pressure plate selectively contacting the first disk to the rotating plate, and a first spring plate pushing the first pressure plate toward the first disk when the double clutch actuator does not operate, and removing force exerted on the first disk by the first pressure plate when the double clutch actuator operates.

The second clutch may include a second disk splined to the second input shaft in the double clutch housing, a second pressure plate supported by a connecting cover and disposed apart from the second disk when the double clutch actuator does not operate, and a second spring plate frictionally contacting the rotating plate, the second disk and the second pressure plate by pushing the rotating plate toward the second disk through the double clutch housing when the double clutch actuator operates.

The connecting cover is connected to the second pressure plate through a penetration hole formed at an exterior circumference of the double clutch housing.

The engine clutch unit may include a flywheel connected to a crankshaft, a third clutch disposed on the connecting shaft and selectively transmitting the torque of the engine to the connecting shaft through the flywheel, and an engine clutch actuator controlling operation of the third clutch.

The third clutch may include a third disk splined to the connecting shaft, a third pressure plate selectively contacting the third disk to the flywheel, and a third spring plate pushing the third pressure plate toward the third disk when the engine clutch actuator operates, and removing force of the third pressure plate exerted on the third disk when the engine clutch actuator does not operate.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a drawing for illustrating the second operating state of a double clutch system for a hybrid electric vehicle according to an exemplary embodiment of the present invention.

Figure 1:
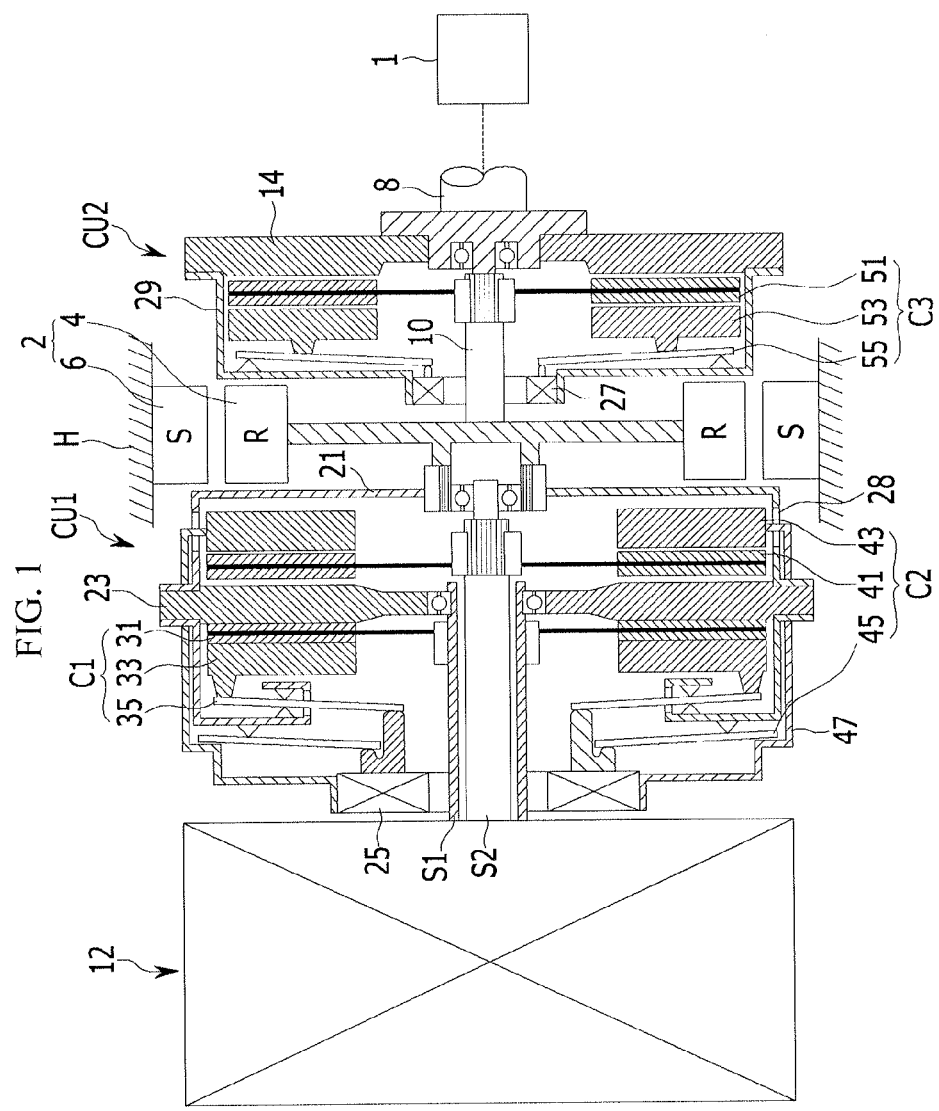
FIG. 1 is a schematic diagram of a double clutch system for a hybrid electric vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a double clutch system for a hybrid electric vehicle according to an exemplary embodiment of the present invention.

Referring to FIG. 1, a double clutch system for a hybrid electric vehicle according to an exemplary embodiment of the present invention includes a connecting shaft 10, and the connecting shaft 10 is connected to a motor/generator 2 and receives torque of the motor/generator 2. In addition, the connecting shaft 10 receives torque from a crankshaft 8 of an engine 1 selectively. The torque is input selectively to two input shafts S1 and S2 through two clutches C1 and C2 and is changed at a transmission device 12. In addition, the changed torque is output.

Herein, the motor/generator 2, the same as that used in a conventional electric vehicle, includes a rotor 4 and a stator 6 and functions as a motor and a generator simultaneously.

The rotor 4 is connected to the connecting shaft 10 and the stator 6 is fixed to a transmission housing H.

The hybrid electric vehicle includes a double clutch system according to an exemplary embodiment of the present invention, and the double clutch system includes a double clutch unit CU1 and an engine clutch unit CU2.

The double clutch unit CU1 transmits the torque transmitted from the motor/generator 2 or the crankshaft 8 of the engine 1 to the connecting shaft 10 to the first input shaft S1 or the second input shaft S2 through the first and second clutches C1 and C2.

In addition, the engine clutch unit CU2 selectively transmits the torque of the engine 1 to the connecting shaft 10 through the flywheel 14 connected to the crankshaft 8 of the engine 1.

Herein, one input shaft of the two input shafts S1 and S2 is a hollow shaft and is configured to transmit torque to constituent elements of the transmission device 12 involved in odd-numbered shift-speeds. It is exemplified in this specification that the first input shaft S1 is the hollow shaft.

The second input shaft S2 is inserted in the first input shaft S1 without rotational interference with the first input shaft S1. The first input shaft S1 and second input shaft S2 are disposed on the same axis. The second input shaft S2 transmits torque to constituent elements of the transmission device 12 involved in even-numbered shift-speeds.

The double clutch unit CU1 includes a double clutch housing 21, a rotating plate 23, a first clutch C1, a second clutch C2 and a double clutch actuator 25.

The double clutch housing 21 is a cylindrical shape and has a side surface that is open. The other side surface of the double clutch housing 21 is connected to the connecting shaft 10, and the double clutch housing 21 is movable in an axial direction. The rotating plate 23 is disposed in a middle portion of the double clutch housing 21. An external circumferential portion of the rotating plate 23 is connected to the double clutch housing 21 and receives the torque of the connecting shaft 10. In addition, at least one penetration hole 28 is formed at an exterior circumference of the double clutch housing 21.

The first clutch C1 is disposed on the first input shaft S1 in the double clutch housing 21 and is configured to selectively transmit the torque of the connecting shaft 10 to the first input shaft S1.

That is, the first clutch C1 includes a first disk 31 frictionally contacting to the rotating plate 23 at a normal state (i.e., a state where the double clutch actuator 25 does not operate), disposed at a side of the rotating plate 23 close to the transmission device 12, and splined to the first input shaft S1, a first pressure plate 33 disposed at a side of the first disk 31 close to the transmission device 12, and a first spring plate 35 pushing the first pressure plate 33 toward the first disk 31 at the normal state.

In addition, the second clutch C2 is disposed on the second input shaft S2 in the double clutch housing 21 and is configured to selectively transmit the torque of the connecting shaft 10 to the second input shaft S2.

That is, the second clutch C2 includes a second disk 41 disposed apart from the rotating plate 23 at the normal state, disposed at the other side of the rotating plate 23, and splined to the second input shaft S2, a second pressure plate 43 disposed at the other side of the second disk 41, and a second spring plate 45 transmitting operating force of the double clutch actuator 25 to the double clutch housing 21 when the double clutch actuator 25 operates.

The connecting cover 47 is a cylindrical shape, has both ends that are open, and encloses a portion of an exterior circumference of the double clutch housing 21. The double clutch actuator 25 is mounted at the side surface of the connecting cover 47. The other side surface of the connecting cover 47 is connected to the second pressure plate 43 through the penetration hole 28 of the double clutch housing 21. The connecting cover 47 is rotatable together with the double clutch housing 21.

The double clutch actuator 25 simultaneously controls the first and second clutches C1 and C2.

That is, the first clutch C1 transmits the torque and the second clutch C2 cuts off the torque when the double clutch actuator 25 does not operate. On the contrary, the first clutch C1 cuts off the torque and the second clutch C2 transmits the torque when the double clutch actuator 25 operates.

Meanwhile, the engine clutch unit CU2 includes the flywheel 14, a third clutch C3, and clutch cover 29, and an engine clutch actuator 27.

The flywheel 14 is connected to the crankshaft 8 and is mounted on the connecting shaft 10 without rotational interference with the connecting shaft 10.

The third clutch C3 is disposed on the connecting shaft 10 and selectively transmits the torque of the engine 1 to the connecting shaft 10 through the flywheel 14.

The third clutch C3 includes a third disk 51 disposed at a side of the flywheel 14, disposed apart from the flywheel 14 at a normal state (i.e., state where the engine clutch actuator 27 does not operate), and splined to the connecting shaft 10, a third pressure plate 53 disposed at a side of the third disk 51, and a third spring plate 55 transmits operating force of the engine clutch actuator 27 to the third pressure plate 53 is the engine clutch actuator 27 operates.

The clutch cover 29 is a cylindrical shape, has both side surfaces that are open, and accommodates the third clutch C3 therein. The engine clutch actuator 27 is mounted at the side surface of the clutch cover 29, and the other side surface of the clutch cover 29 is coupled to the flywheel 14.

The engine clutch actuator 27 controls operation of the third clutch C3. That is, the third spring plate 55 pushes the third pressure plate 53 toward the third disk 51 when the engine clutch actuator 27 operates.

Meanwhile, the transmission device 12 is adapted to receive the torque from input gears on the first and second input shafts S1 and S2, change the torque, and output the changed torque. The transmission device 12 includes a plurality of speed output devices and a reverse speed output device that are disposed in parallel with the first and second input shafts S1 and S2. Each of the speed output devices includes speed gears on an output shaft, and each of the speed gears is engaged with any one input gear. The speed gears are operably connected to the output shaft by synchronizer units.

The transmission device 12 is not directly related to the double clutch system for the hybrid electric vehicle according to the exemplary embodiment of the present invention, and thus detailed description thereof will be omitted.

The double clutch system for the hybrid electric vehicle according to the exemplary embodiment of the present invention, as shown in FIG. 1, can start the vehicle without operation of the actuator by operation of the motor/generator 2 as a consequence of using the first clutch C1 of normal close type in charge of starting and the odd-numbered shift-speeds.

In addition, since the engine clutch unit CU2 of normal open type is used, slip control of the first clutch C1 according to idle RPM of the engine 1 is unnecessary.

That is, the engine clutch actuator 27 of the engine clutch unit CU2 and the double clutch actuator 25 of the double clutch unit CU1 do not operate when the vehicle is started by the motor/generator 2. Since the first clutch C1 is engaged at this state, the vehicle can be started by operation of the motor/generator 2.

Figure 2:
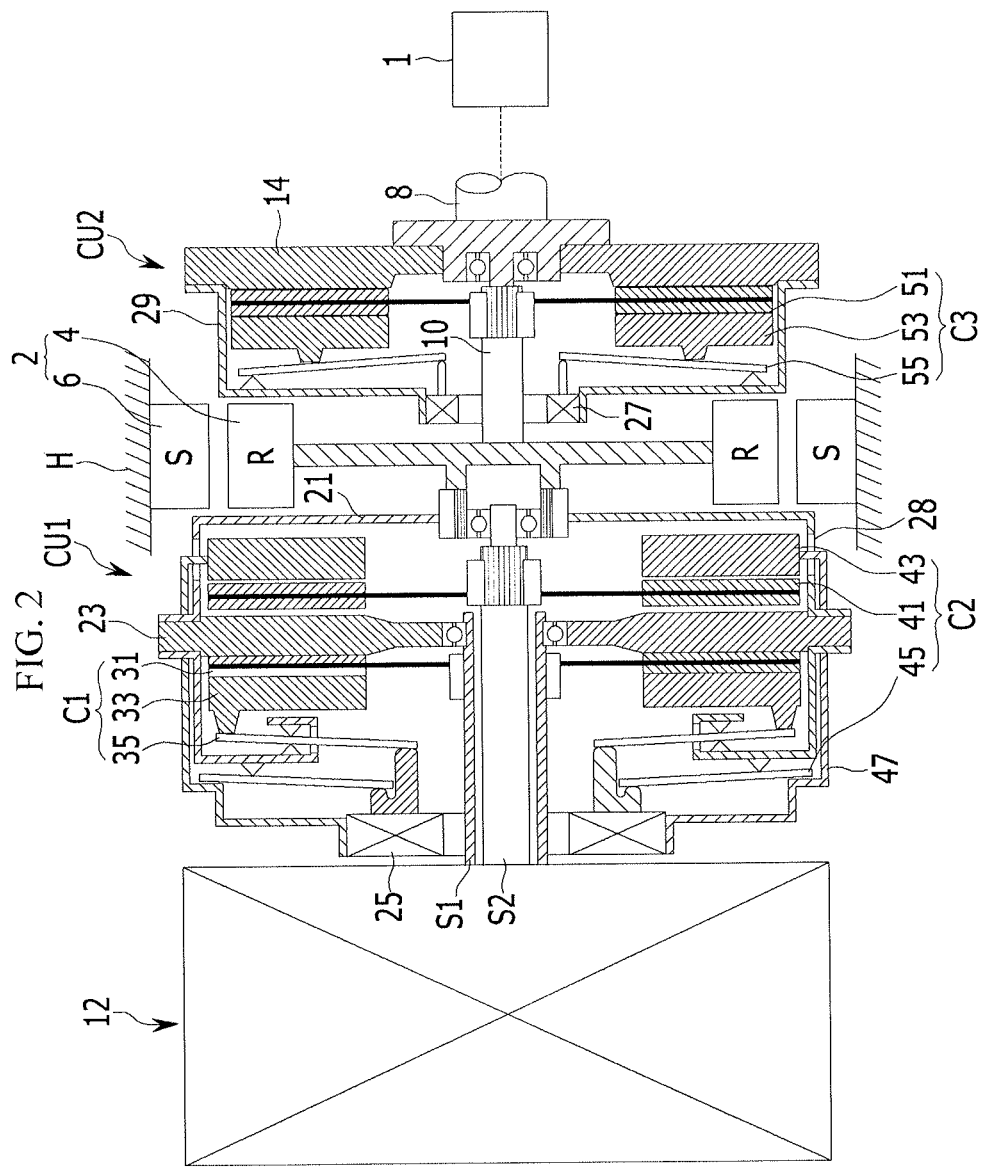
FIG. 2 is a drawing for illustrating the first operating state of a double clutch system for a hybrid electric vehicle according to an exemplary embodiment of the present invention.

FIG. 2 is a drawing for illustrating the first operating state of a double clutch system for a hybrid electric vehicle according to an exemplary embodiment of the present invention. The engine clutch actuator 27 operates in FIG. 2.

Referring to FIG. 2, when the torque of the engine 1 is needed due to high-speed drive, charging, or uphill drive in a state that the hybrid electric vehicle is started by operation of the motor/generator 2, the engine clutch actuator 27 of the engine clutch unit CU2 operates so as to engage the third clutch C3. Thereby, the torque of the engine is transmitted to the connecting shaft 10.

Therefore, the engine generates the torque required to drive with high-speed or on uphill road and supplies the torque for charging a battery through the motor/generator 2.

FIG. 3 is a drawing for illustrating the second operating state of a double clutch system for a hybrid electric vehicle according to an exemplary embodiment of the present invention. The double clutch actuator 25 operates in FIG. 3.

Referring to FIG. 3, when the hybrid electric vehicle shifts to any one of the even-numbered shift-speeds in a state of being started by operation of the motor/generator 2, the double clutch actuator 25 operates.

In this case, the first spring plate 35 moves to the left in the drawing and causes the first pressure plate 33 away from the first disk 31. The second spring plate 45 pushes the housing 21 to the right in the drawing and contacts the rotating plate 23, the second disk 41 and the second pressure plate 43. Therefore, the first clutch C1 is released and the second clutch C2 is engaged such that the torque of the motor/generator 2 or the engine 1 is transmitted to the second input shaft S2 involved in the even-numbered shift-speeds through the connecting shaft 10.

As described above, the double clutch system for the hybrid electric vehicle according to the exemplary embodiment of the present invention uses the first clutch C1 of normal close type. Therefore, the engine 1 can be started without operation of the double clutch actuator 25 by operation of the motor/generator 2, and starting impact may be prevented. In addition, since slip control of clutch disks is unnecessary, abrasion of the clutch disk may be minimized and durability may be improved.

In addition, since the engine clutch unit CU2 of normal open type is used, the engine is connected only when the torque of the engine is necessary. In addition, since unnecessary drive of the actuators at shifting is restricted, fuel economy may be enhanced.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A double clutch system for a hybrid electric vehicle including a connecting shaft that is continuously connected to a motor/generator and is selectively connected to an engine and transmitting torque transmitted to the connecting shaft selectively to two input shafts, the double clutch system comprising: a double clutch unit including: a double clutch actuator; and first and second clutches selectively connecting the connecting shaft to the two input shafts by control of the double clutch actuator, wherein the first clutch connects the connecting shaft to a first input shaft of the two input shafts and the second clutch does not connect the connecting shaft to a second input shaft of the two input shafts when the first clutch is engaged, in a first operating state, and wherein the first clutch does not connect the connecting shaft to the first input shaft and the second clutch connects the connecting shaft to the second input shaft when the second clutch is engaged, in a second operating state; and an engine clutch unit selectively connecting the engine to the connecting shaft, wherein the double clutch unit further comprises: a double clutch housing connected to the connecting shaft and being movable in an axial direction and a rotating friction plate fixed at an inside of the double clutch housing and receiving torque of the connecting shaft, wherein the first clutch is disposed on the first input shaft and transmits torque of the rotating friction plate to the first input shaft only in the first operating state, and wherein the second clutch is disposed on the second input shaft and transmits the torque of the rotating friction plate to the second input shaft only in the second operating state.

2. The double clutch system of claim 1, wherein the first clutch comprises: a first disk splined to the first input shaft in the double clutch housing; a first pressure plate selectively contacting the first disk to the rotating friction plate; and a first spring plate pushing the first pressure plate toward the first disk in the first operating state, and removing force exerted on the first disk by the first pressure plate in the second operating state.

3. The double clutch system of claim 1, wherein the second clutch comprises: a second disk splined to the second input shaft in the double clutch housing; a second pressure plate supported by a connecting cover and disposed apart from the second disk in the first operating state; and a second spring plate frictionally contacting the rotating friction plate, the second disk and the second pressure plate by pushing the rotating friction plate toward the second disk through the double clutch housing in the second operating state.

4. The double clutch system of claim 3, wherein the double clutch actuator is mounted at a side surface of the connecting cover.

5. The double clutch system of claim 4, wherein another side surface of the connecting cover is connected to the second pressure plate through a penetration hole formed at an exterior circumference of the double clutch housing.

6. The double clutch system of claim 5, wherein the connecting cover and the double clutch housing are movable relatively in the axial direction.

7. The double clutch system of claim 1, wherein the first input shaft is a hollow shaft and is involved in odd-numbered shift-speeds, and the second input shaft penetrates the first input shaft and is involved in even-numbered shift-speeds.

8. The double clutch system of claim 1, wherein the engine clutch unit comprises:
a flywheel connected to a crankshaft;
a third clutch disposed on the connecting shaft and selectively transmitting the torque of the engine to the connecting shaft through the flywheel; and
an engine clutch actuator controlling operation of the third clutch.

9. The double clutch system of claim 8, wherein the third clutch comprises:
a third disk splined to the connecting shaft;
a third pressure plate selectively contacting the third disk to the flywheel; and
a third spring plate pushing the third pressure plate toward the third disk when the engine clutch actuator operates, and removing force of the third pressure plate exerted on the third disk when the engine clutch actuator does not operate.

10. The double clutch system of claim 9, wherein the engine clutch unit further comprises a clutch cover coupled to the flywheel and accommodating the third clutch therein.

11. The double clutch system of claim 10, wherein the engine clutch actuator is mounted at a side surface of the clutch cover, and the other side surface of the clutch cover is coupled to the flywheel.

12. The double clutch system of claim 1, wherein the motor/generator comprises:
a rotor connected to the connecting shaft; and
a stator disposed radially outside of the rotor and fixed to a transmission housing.

13. A double clutch system for a hybrid electric vehicle comprising: a motor/generator; a connecting shaft continuously connected to the motor/generator and receiving torque of the motor/generator; first and second input shafts alternately connected to the connecting shaft; a double clutch unit including: a double clutch actuator; and first and second clutches alternately connecting the first and second input shafts to the connecting shaft by control of the double clutch actuator, wherein the first clutch connects the first input shaft to the connecting shaft when the first clutch is engaged, in a first operating state, and the second clutch connects the second input shaft to the connecting shaft when the second clutch is engaged, in a second operating state; and an engine clutch unit selectively connecting an engine to the connecting shaft, wherein the double clutch unit further comprises: a double clutch housing connected to the connecting shaft and being movable in an axial direction; and a rotating friction plate fixed at an inside of the double clutch housing and receiving torque of the connecting shaft, wherein the first clutch is disposed on the first input shaft and transmits torque of the rotating friction plate to the first input shaft only in the first operating state, and wherein the second clutch is disposed on the second input shaft and transmits the torque of the rotating friction plate to the second input shaft in the second operating state.

14. The double clutch system of claim 13, wherein the first clutch comprises: a first disk splined to the first input shaft in the double clutch housing; a first pressure plate selectively contacting the first disk to the rotating friction plate; and a first spring plate pushing the first pressure plate toward the first disk in the first operating state, and removing force exerted on the first disk by the first pressure plate in the second operating state.

15. The double clutch system of claim 13, wherein the second clutch comprises: a second disk splined to the second input shaft in the double clutch housing; a second pressure plate supported by a connecting cover and disposed apart from the second disk in the first operating state; and a second spring plate frictionally contacting the rotating friction plate, the second disk and the second pressure plate by pushing the rotating friction plate toward the second disk through the double clutch housing in the second operating state.

16. The double clutch system of claim 15, wherein the connecting cover is connected to the second pressure plate through a penetration hole formed at an exterior circumference of the double clutch housing.

17. The double clutch system of claim 13, wherein the engine clutch unit comprises:
a flywheel connected to a crankshaft;
a third clutch disposed on the connecting shaft and selectively transmitting the torque of the engine to the connecting shaft through the flywheel; and
an engine clutch actuator controlling operation of the third clutch.

18. The double clutch system of claim 17, wherein the third clutch comprises:
a third disk splined to the connecting shaft;
a third pressure plate selectively contacting the third disk to the flywheel; and
a third spring plate pushing the third pressure plate toward the third disk when the engine clutch actuator operates, and removing force of the third pressure plate exerted on the third disk when the engine clutch actuator does not operate.

* * * * *